US008566240B2

(12) United States Patent (10) Patent No.: US 8,566,240 B2
Smith et al. (45) Date of Patent: Oct. 22, 2013

(54) SYSTEMS AND METHODS FOR THE PAYMENT OF CUSTOMER BILLS UTILIZING PAYMENT PLATFORM OF BILLER

(75) Inventors: Merrill Brooks Smith, Ft. Lauderdale, FL (US); Phillip Craig Graves, Atlanta, GA (US); Phil M. Chakiris, Atlanta, GA (US)

(73) Assignee: e2interactive, Inc., Atlanta, GA (US)

( * ) Notice: Subject to any disclaimer, the term of this patent is extended or adjusted under 35 U.S.C. 154(b) by 100 days.

(21) Appl. No.: 12/807,046

(22) Filed: Aug. 26, 2010

(65) Prior Publication Data

US 2011/0066517 A1    Mar. 17, 2011

Related U.S. Application Data

(63) Continuation-in-part of application No. 12/564,474, filed on Sep. 22, 2009, which is a continuation of application No. 11/672,082, filed on Feb. 7, 2007, now abandoned.

(60) Provisional application No. 60/885,044, filed on Jan. 16, 2007.

(51) Int. Cl.
*G06Q 40/00* (2012.01)
(52) U.S. Cl.
USPC .......................................................... 705/41
(58) Field of Classification Search
USPC .......................................................... 705/41
See application file for complete search history.

(56) References Cited

U.S. PATENT DOCUMENTS

| 4,795,892 | A |   | 1/1989  | Gilmore |           |
|-----------|---|---|---------|---------|-----------|
| 4,877,947 | A |   | 10/1989 | Mori    |           |
| 5,383,113 | A |   | 1/1995  | Kight   |           |
| 5,511,114 | A |   | 4/1996  | Stimson |           |
| 5,577,109 | A |   | 11/1996 | Stimson |           |
| 5,644,721 | A | * | 7/1997  | Chung et al. | 705/6  |
| 5,705,798 | A | * | 1/1998  | Tarbox  | 235/379   |
| 5,903,633 | A | * | 5/1999  | Lorsch  | 379/114.2 |
| 5,956,700 | A |   | 9/1999  | Landry  |           |
| 5,991,748 | A |   | 11/1999 | Taskett |           |
| 6,000,608 | A |   | 12/1999 | Dorf    |           |
| 6,012,049 | A |   | 1/2000  | Kawan   |           |
| 6,018,570 | A |   | 1/2000  | Matison |           |

(Continued)

OTHER PUBLICATIONS

Tedeschi, Bob. "Google Gets Lift in Test on Its New Pay Service." International Herald Tribune (1R Edition), Jul. 18, 2006.*

(Continued)

*Primary Examiner* — Susanna M Meinecke Diaz
(74) *Attorney, Agent, or Firm* — Landmark Intellectual Property Law, PC

(57) ABSTRACT

The present invention is directed to systems and methods providing payment into a pre-existing customer account with a provider of goods or services, the method facilitated between a customer, a provider of goods or services, and a processor. The method including steps such as receiving from the customer value, identifying information of the customer, and information sufficient to identify the provider and pre-existing account of the customer; accessing a payment platform of the provider; determining information required by the provider in order to provide payment into the customer account; communicating information required by the provider in order to provide payment into the customer account; and providing a value into the customer account.

25 Claims, 7 Drawing Sheets

(56) References Cited

U.S. PATENT DOCUMENTS

| | | | |
|---|---|---|---|
| 6,032,135 A | 2/2000 | Moland | |
| 6,038,549 A | 3/2000 | Davis | |
| 6,047,270 A | 4/2000 | Joao | |
| 6,058,382 A | 5/2000 | Kasai | |
| 6,105,008 A | 8/2000 | Davis | |
| 6,119,106 A | 9/2000 | Mersky | |
| 6,119,946 A | 9/2000 | Teicher | |
| 6,129,275 A | 10/2000 | Urquhart | |
| 6,138,106 A | 10/2000 | Walker | |
| 6,158,657 A | 12/2000 | Hall | |
| 6,173,272 B1 | 1/2001 | Thomas | |
| 6,185,545 B1 | 2/2001 | Resnick | |
| 6,188,752 B1 | 2/2001 | Lesley | |
| 6,189,787 B1 | 2/2001 | Dorf | |
| 6,190,256 B1 | 2/2001 | Walker | |
| 6,202,933 B1 | 3/2001 | Poore | |
| 6,208,851 B1 | 3/2001 | Hanson | |
| 6,226,624 B1 | 5/2001 | Watson | |
| 6,237,023 B1 | 5/2001 | Yoshimoto | |
| 6,282,566 B1 | 8/2001 | Lee | |
| 6,295,522 B1* | 9/2001 | Boesch | 705/41 |
| 6,302,326 B1 | 10/2001 | Symonds | |
| 6,311,165 B1 | 10/2001 | Coutts | |
| 6,311,170 B1 | 10/2001 | Embrey | |
| 6,314,171 B1 | 11/2001 | Dowens | |
| 6,315,195 B1 | 11/2001 | Ramachandran | |
| 6,324,525 B1 | 11/2001 | Kramer | |
| 6,328,341 B2 | 12/2001 | Klure | |
| 6,330,544 B1 | 12/2001 | Walker | |
| 6,333,976 B2 | 12/2001 | Lesley | |
| 6,375,073 B1 | 4/2002 | Aebi | |
| 6,386,457 B1 | 5/2002 | Sorie | |
| 6,397,196 B1 | 5/2002 | Kravetz | |
| 6,422,462 B1 | 7/2002 | Cohen | |
| 6,424,706 B1 | 7/2002 | Katz | |
| 6,434,238 B1 | 8/2002 | Chaum | |
| 6,445,780 B1 | 9/2002 | Rosset | |
| 6,467,684 B2 | 10/2002 | Fite | |
| 6,473,500 B1 | 10/2002 | Risafi | |
| 6,494,367 B1 | 12/2002 | Zacharias | |
| 6,507,644 B1 | 1/2003 | Henderson | |
| 6,529,593 B2 | 3/2003 | Nelson | |
| 6,575,361 B1 | 6/2003 | Graves | |
| 6,581,827 B2 | 6/2003 | Welton | |
| 6,612,487 B2 | 9/2003 | Tidball | |
| 6,615,189 B1 | 9/2003 | Phillips | |
| 6,615,190 B1 | 9/2003 | Slater | |
| 6,648,222 B2 | 11/2003 | McDonald | |
| 6,651,885 B1 | 11/2003 | Arias | |
| 6,659,259 B2 | 12/2003 | Knox | |
| 6,805,289 B2 | 10/2004 | Noriega | |
| 6,882,984 B1 | 4/2005 | Boyle | |
| 6,918,537 B2 | 7/2005 | Graves | |
| 6,961,412 B2 | 11/2005 | Ruckart | |
| 7,072,864 B2 | 7/2006 | Brake | |
| 7,083,084 B2 | 8/2006 | Graves | |
| 7,096,003 B2 | 8/2006 | Joao | |
| 7,131,582 B2 | 11/2006 | Welton | |
| 7,209,890 B1 | 4/2007 | Peon | |
| 7,269,256 B2 | 9/2007 | Rosen | |
| 7,292,998 B2 | 11/2007 | Graves | |
| 7,328,190 B2 | 2/2008 | Smith | |
| 7,363,265 B2 | 4/2008 | Horgan | |
| 7,370,012 B2 | 5/2008 | Karns | |
| 7,398,248 B2 | 7/2008 | Phillips | |
| 7,483,862 B1 | 1/2009 | Robinson | |
| 7,536,349 B1 | 5/2009 | Magdalena | |
| 7,566,000 B2 | 7/2009 | Agnostio | |
| 8,010,425 B1* | 8/2011 | Garcia et al. | 705/35 |
| 2001/0001321 A1 | 5/2001 | Resnick | |
| 2001/0001856 A1 | 5/2001 | Gould | |
| 2001/0023415 A1 | 9/2001 | Keil | |
| 2001/0032878 A1 | 10/2001 | Tsiounis | |
| 2001/0042784 A1 | 11/2001 | Fite | |
| 2002/0022966 A1 | 2/2002 | Horgan | |
| 2002/0107791 A1* | 8/2002 | Nobrega et al. | 705/39 |
| 2002/0133467 A1* | 9/2002 | Hobson et al. | 705/64 |
| 2002/0190123 A1 | 12/2002 | Anvekar | |
| 2003/0001005 A1 | 1/2003 | Risafi | |
| 2003/0009382 A1 | 1/2003 | D'Arbeloff et al. | |
| 2003/0028481 A1 | 2/2003 | Flitcroft | |
| 2003/0033246 A1 | 2/2003 | Slater | |
| 2003/0046222 A1 | 3/2003 | Bard | |
| 2003/0055782 A1 | 3/2003 | Slater | |
| 2003/0061157 A1 | 3/2003 | Hirka | |
| 2003/0070080 A1 | 4/2003 | Rosen | |
| 2003/0105672 A1 | 6/2003 | Epstein | |
| 2003/0126079 A1* | 7/2003 | Roberson et al. | 705/40 |
| 2003/0135462 A1 | 7/2003 | Brake | |
| 2003/0144935 A1 | 7/2003 | Sobek | |
| 2003/0154163 A1 | 8/2003 | Phillips | |
| 2003/0172031 A1 | 9/2003 | Graves | |
| 2003/0187781 A1 | 10/2003 | Goodman | |
| 2003/0191711 A1 | 10/2003 | Jamison et al. | |
| 2003/0204457 A1* | 10/2003 | Arias | 705/30 |
| 2003/0218062 A1 | 11/2003 | Noriega | |
| 2004/0007618 A1 | 1/2004 | Oram | |
| 2004/0009760 A1 | 1/2004 | Laybourn | |
| 2004/0064412 A1 | 4/2004 | Phillips | |
| 2004/0117302 A1 | 6/2004 | Weichert et al. | |
| 2004/0118914 A1 | 6/2004 | Smith | |
| 2004/0133511 A1 | 7/2004 | Smith | |
| 2004/0181453 A1 | 9/2004 | Ray | |
| 2004/0205023 A1 | 10/2004 | Hafer | |
| 2004/0210449 A1 | 10/2004 | Breck | |
| 2004/0215564 A1 | 10/2004 | Lawlor | |
| 2004/0215573 A1 | 10/2004 | Teutenberg | |
| 2004/0218741 A1 | 11/2004 | Welton | |
| 2004/0230536 A1 | 11/2004 | Fung | |
| 2004/0260607 A1 | 12/2004 | Robbins et al. | |
| 2004/0267663 A1 | 12/2004 | Karns | |
| 2005/0001027 A1* | 1/2005 | Bahar | 235/382 |
| 2005/0027655 A1 | 2/2005 | Sharma | |
| 2005/0033645 A1 | 2/2005 | Duphily | |
| 2005/0051619 A1 | 3/2005 | Graves | |
| 2005/0061872 A1 | 3/2005 | Paschini | |
| 2005/0125288 A1 | 6/2005 | Fou | |
| 2005/0127169 A1 | 6/2005 | Foss | |
| 2005/0131815 A1 | 6/2005 | Fung | |
| 2005/0143051 A1 | 6/2005 | Park | |
| 2005/0182720 A1 | 8/2005 | Willard | |
| 2005/0203835 A1 | 9/2005 | Nhaissi | |
| 2005/0216824 A1* | 9/2005 | Ferguson et al. | 715/501.1 |
| 2005/0228717 A1 | 10/2005 | Gusler | |
| 2005/0234820 A1* | 10/2005 | MacKouse | 705/40 |
| 2005/0261995 A1* | 11/2005 | Phelan | 705/31 |
| 2005/0263587 A1 | 12/2005 | Martinez | |
| 2005/0278216 A1 | 12/2005 | Graves | |
| 2006/0023856 A1 | 2/2006 | Welton | |
| 2006/0026073 A1 | 2/2006 | Kenny | |
| 2006/0085335 A1 | 4/2006 | Crawford | |
| 2006/0100927 A1 | 5/2006 | Zormati | |
| 2006/0113376 A1 | 6/2006 | Reed | |
| 2006/0136299 A1 | 6/2006 | Ruhmkorf | |
| 2006/0161490 A1 | 7/2006 | Chakiris | |
| 2006/0163347 A1 | 7/2006 | Foss | |
| 2006/0195359 A1 | 8/2006 | Robinson | |
| 2006/0207856 A1 | 9/2006 | Dean | |
| 2006/0213985 A1 | 9/2006 | Walker | |
| 2006/0229937 A1 | 10/2006 | Walker | |
| 2006/0289621 A1 | 12/2006 | Foss | |
| 2007/0005685 A1 | 1/2007 | Chau | |
| 2007/0057045 A1 | 3/2007 | Beck | |
| 2007/0083460 A1* | 4/2007 | Bachenheimer | 705/38 |
| 2007/0118478 A1 | 5/2007 | Graves | |
| 2007/0119920 A1 | 5/2007 | Hogg | |
| 2007/0187490 A1 | 8/2007 | Feldman | |
| 2007/0233615 A1* | 10/2007 | Tumminaro | 705/75 |
| 2008/0041938 A1 | 2/2008 | Wise | |
| 2008/0109356 A1 | 5/2008 | Sutton | |
| 2008/0133266 A1* | 6/2008 | Allen | 705/2 |
| 2008/0270246 A1 | 10/2008 | Chen | |
| 2009/0094126 A1 | 4/2009 | Killian et al. | |
| 2009/0204522 A1 | 8/2009 | Meyer et al. | |

(56) References Cited

U.S. PATENT DOCUMENTS

| | | |
|---|---|---|
| 2009/0298427 A1 | 12/2009 | Wilkinson et al. |
| 2010/0005025 A1 | 1/2010 | Kumar et al. |
| 2011/0082772 A1* | 4/2011 | Hirson .................... 705/27.1 |
| 2011/0270693 A1 | 11/2011 | Paschini |

OTHER PUBLICATIONS

Patent Cooperation Treaty International Search Report, PCT/US 11/43525.

Patent Cooperation Treaty International Search Report, PCT/US 11/46603.

* cited by examiner

SYSTEMS AND METHODS FOR THE PAYMENT OF CUSTOMER BILLS UTILIZING PAYMENT PLATFORM OF BILLER

RELATED APPLICATIONS

This application is continuation-in-part application of U.S. patent application Ser. No. 12/564,474, filed on Sep. 22, 2009 (incorporated herein by reference in its entirety), which in turn is a continuation of U.S. patent application Ser. No. 11/672,082, filed on Feb. 7, 2007 (incorporated herein by reference in its entirety), which in turn is based upon U.S. Provisional Patent Application 60/885,044 filed on Jan. 16, 2007 (incorporated herein by reference in its entirety).

BACKGROUND OF THE INVENTION

The present invention is generally directed to systems and methods utilized to pay customer bills with third party billers, or directed payees. Specifically, the present invention is directed to systems and methods that avoid the typical payment channels and instead utilize the payees own payment platform.

There are numerous bill payment programs and plans, ranging from recurring payment plans linked to a financial account of a customer to online bill pay offered by most major banking institutions. Such bill pay systems are often focused at the unbanked segment of the population, and may provide a more efficient and inexpensive method of paying bills than prior art methods such as money orders or Western Union.

Many bill pay systems maintained and operated by payment processors require a customer to enter information regarding the account to be paid and to provide funding to the payment processor. The payment processor generally pays the bills identified by the customer through traditional methods—typically a value transfer. Such value transfer is typically accomplished through the use of a billing aggregator. Billing aggregators generally gather billing records from one company and posts the records to another billing system. Typically, if a customer uses bill payment processor "A" to pay bills to its electric company, the transaction is typically as follows: (i) customer pays money (currency) to payment processor "A"; (ii) payment processor "A" pays a billing aggregator (e.g., RPS, Checkfree); (iii) billing aggregator pays the electric company.

While this process is often useful for the clearinghouse capabilities offered by the billing aggregator, it involves an extra value transfer and all of its accompanying fees, costs, charges, and risks.

Accordingly, a system that obviates billing aggregators is desirable. However, in order to avoid the connections provided by most billing aggregators, some link to the payment platform of the payee (or provider of goods or services that is to be paid) must be maintained and/or accessed. More and more providers are moving towards maintaining their own payment platform—typically accessed by customers via the interne—as an additional means of accepting payment. Accordingly, a system that can avoid using a billing aggregator by instead directly accessing a provider or payee's payment platform is desirable.

In addition to the drawbacks of billing aggregators, most bill pay systems require a customer to fund the bill pay account in a particular manner—typically with cash at the time of account set-up or payment. Given the ubiquitous nature of stored value cards, a bill pay system that utilizes stored value cards as payment options is desirable. However, it is understood that many providers or payees may not accept stored value—particularly stored value that is related to a closed-loop system. Accordingly, it is desirable to maintain systems and methods of accepting typically closed-loop stored value from a customer, but providing open-loop stored value (e.g., a prepaid Visa debit card number) to the provider or payee.

SUMMARY OF THE INVENTION

Aspects of the invention may comprise a method of providing payment into a pre-existing customer account with a provider of goods or services, the method facilitated between a customer, a provider of goods or services, and a processor, the method comprising receiving from the customer value, identifying information of the customer, and information sufficient to identify the provider and pre-existing account of the customer; accessing a payment platform of the provider; determining information required by the provider in order to provide payment into the customer account; communicating information required by the provider in order to provide payment into the customer account; and providing a value into the customer account.

Other aspects of the invention may comprise a method of providing payment into a pre-existing customer account with a provider of goods or services, the method facilitated between a customer, a provider of goods or services, and a processor, the method comprising: receiving from the customer value, identifying information of the customer, comprising the customer's name and address, and information sufficient to identify the provider and pre-existing account of the customer, comprising the account number of the pre-existing customer account; identification of an amount of payment to make to the pre-existing customer account with the provider; accessing, by the processor and via the interne, a payment website of the provider; scraping the payment website in order to determine the information required by the provider to make a payment; the provider acting in lieu of the customer and entering identifying information received from the customer into the payment website; determining if the provider accepts payment in the form of value received from the customer; upon a determination that the provider accepts payment in the form of value received from the customer, conveying value received from the customer to the provider; upon a determination that the provider does not accept payment in the form of value received from the customer, generating a virtual prepaid debit card number, and conveying the virtual prepaid debit card number to the provider; and providing a confirmation of payment to the customer.

Other aspects of the invention may comprise a processor for providing payment into a pre-existing customer account of a customer with a provider of goods or services, the processor in selective communication with the customer and the provider, the processor comprising: a customer interface that provides selectable communication between the processor and the customer, the customer interface configured to receive from the customer value, identifying information of the customer, comprising the customer's name and address, information sufficient to identify the provider and pre-existing account of the customer, comprising the account number of the pre-existing customer account; and identification of an amount of payment to make to the pre-existing customer account with the provider; a provider interface that provides selectable communication between the processor and the provider, the provider interface configured to: access a payment platform or website of the provider; and provide information into the payment platform or website of the provider; a web data extraction module in communication with the provider interface, the web data extraction module being configured to determine the information required by the provider to make a payment; a processing module in communication with the customer interface, provider interface, and web data extraction module, the processing module configured to: entering identifying information received from the customer into the payment platform or website; provide value to the payment platform or website.

These and other aspects will become apparent from the following description of the invention taken in conjunction with the following drawings, although variations and modifications may be effected without departing from the spirit and scope of the novel concepts of the invention.

BRIEF DESCRIPTION OF THE DRAWING

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which.

Figure 1:
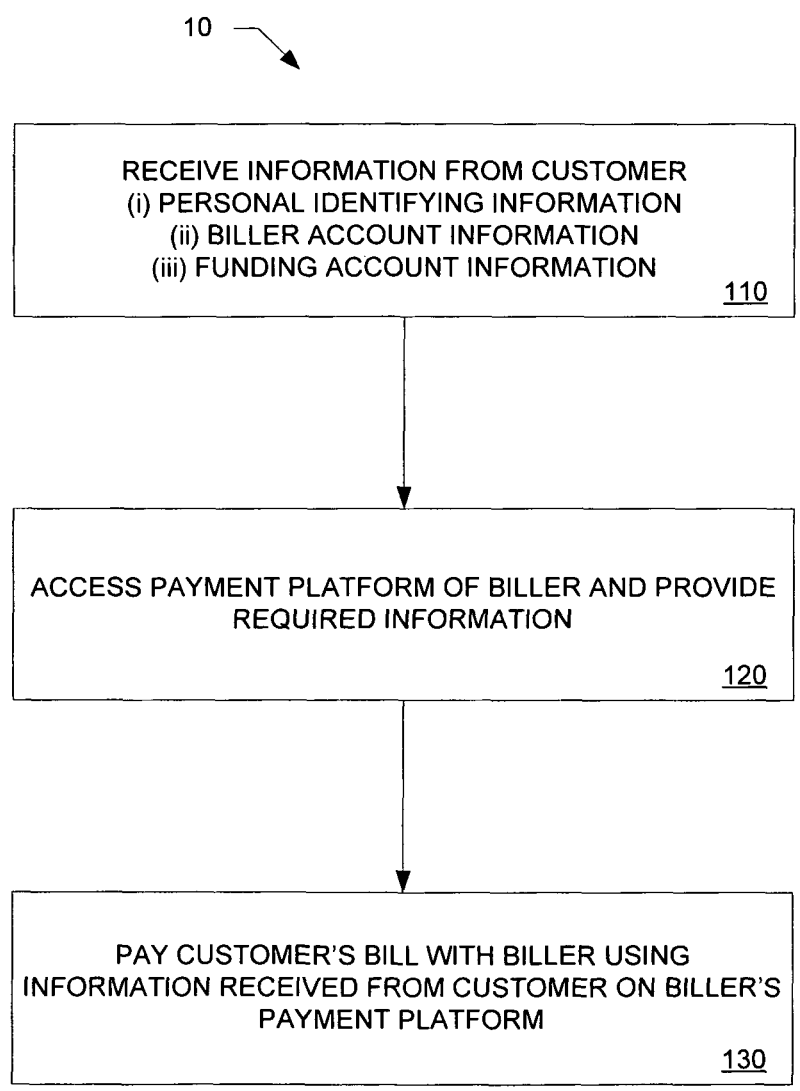
FIG. 1 illustrates a method of facilitating the payment of customer bills utilizing the payment platform of the biller, in accordance with some embodiments of the present invention.

Before any embodiment of the invention is explained in detail, it is to be understood that the present invention is not limited in its application to the details of construction and the arrangements of components set forth in the following description or illustrated in the drawings.

The present invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular. Reference figures preceded with "S" (e.g., S100) indicates a step.

In general, the present invention is directed to systems and methods of conducting a bill payment program. Specifically, the present invention is directed to a bill payment program wherein a customer provides various personal and account identification information to a processor, and the processor—acting as the customer—utilizes the payment platform (e.g., payment web-page) of the biller to provide direct payment. The systems and methods discussed herein also provide for the processor to accept stored value as payment (including closed-loop stored value, such as, for example, a Wal-Mart Gift Card), while providing a virtual prepaid debit card (e.g., a Visa-branded debit card number) to the biller as payment.

With reference to FIG. 1, a method 10 of paying bills in accordance with some embodiments of the present invention will now be discussed. The method depicted in FIG. 1 is generally facilitated between a customer, a processor, and a biller.

The customer may be any party that is utilizing the bill payment systems and methods to make a payment. While the discussion below may be presented that the party making the payment is the same party that incurred the debt or will benefit from the payment—this is not necessarily the case. In other words, the bill payment systems and methods presented herein provide a means for providing payment to pre-existing customer accounts with providers of goods or services. However, it is contemplated that the "customer" providing payment to the pre-existing account may not be the same party who owns or otherwise benefits from the pre-existing account. An example of this may be a parent making a payment to an account held in the parent's child or dependent's name.

The processor is the party receiving communications from the customer and interacting with the biller, or more specifically, the payment platform or web-site of the biller. While the discussion below may present the processor as a separate, intermediate system, it is contemplated that the processor may be associated with one or more billers, or may be associated with or part of a retailer or merchant.

The biller is the party who holds the pre-existing customer account. Generally speaking, billers may be providers of goods or services; however, there may be instances where the billing and collections side of a provider may be outsourced to a separate unrelated party. The present invention is intended to cover this scenario as well, and accordingly the term "biller" and "provider of goods or services" are intended to be related. A "biller" may be a "provider of goods or services," but a "provider of goods or services" need not be a "biller."

Communications between the customer, processor and biller may be discussed below as if such communications are direct. However, it is contemplated that such communications may require additional parties or devices. For example, a customer may interact with the processor via the Internet, telephone (e.g., interactive voice recognition (IVR) system), messaging systems (e.g., short messaging systems (SMS) or media messaging systems (MMS)), applications or applets running on various electronic devices, point-of-sale terminals or devices, or via merchant communications. In circumstances where intermediate devices or parties are utilized (e.g., the use of a point-of-sale device at a merchant or merchant location), settlement may occur on the normal cycle established between the intermediate party and the processor. In such circumstances, there may be a period of time when the processor has made a payment but has not yet collected from customer.

An example of a customer communicating with the processor may comprise numerous channels of communication as well. For example, a customer may register with the processor and provide some initial information via a first channel—for example, the Internet, but may then request payment of the bill via a second channel—for example, via a merchant point-of-sale device and merchant-to-processor communication links during an in-lane transaction at the merchant.

FIG. 1 represents some embodiments of the present invention in a very basic sense—comprising three (3) steps. First, at S110 the processor receives from the customer various pieces of information, comprising, for instance, (i) personal identifying information; (ii) biller account information; and (iii) funding account information.

Personal identifying information may comprise information required by billers to make payments to customer accounts. For example, personal identifying information may comprise the customer's name, address, date-of-birth, log-in information, and password information.

Biller account information may comprise information sufficient for the processor to identify the particular biller and the particular account with the biller. For example, biller account information may comprise an identification of a biller and the account number of the pre-existing customer account. In some circumstances and in accordance with some embodiments of the present invention, the biller account information may be information associated with a specific device that in turn is associated with an account. For example, the biller account information may comprise a telephone number of an electronic device. Such a telephone number may be sufficient to determine the provider and the customer's account number with the provider.

Funding account information may comprise information—or value itself—that is used to fund the bill payment transaction. Funding account information may comprise financial account information (e.g. checking account information), stored value account information (e.g., a stored value account number), or any other type of account information from which value may be withdrawn for payment.

Note that "stored value" typically refers to an indicia that has an associated account with value held therein. Accordingly, the provision of stored value account numbers—such as the account number on a prepaid Visa debit card or Wal-Mart gift card—may be deemed to convey value. "Stored value" may be defined as "open-loop" or "closed-loop" as one of ordinary skill in the art would understand. For example, "closed-loop" stored value may generally be redeemed by a limited number of parties, often limited by the party (or its representative) issuing or providing the stored value in the first instance. For instance, a Wal-Mart gift card is a closed-loop stored value card, since it can only be redeemed at Wal-Mart, and cannot be used elsewhere. Prepaid Visa, MasterCard, Discover, or American Express stored value cards are to be considered "open-loop." Although such value may only be redeemed at locations that accepts Visa, MasterCard, Discover, or American Express, the redemption location is not tied to the party issuing or providing the stored value.

At S120, the processor may access the payment platform of the biller directly and may provide the information required of the biller to make a payment. For example, the processor may be required to provide the customer's name, address, and/or account number.

At S130, the processor may provide payment to the payment platform of the biller. For example, in some embodiments the processor may facilitate a direct transfer of value from the funding account identified by the customer to the biller (minus any applicable fees or taxes). In some embodiments of the present invention the processor may receive value from the customer in one format, and may exchange such received value for value in a format accepted by the biller. For example, the customer may provide the processor with closed-loop stored value, and the processor may pay the biller using open-loop stored value.

As can be seen from the method 10 depicted in FIG. 1, the processor stands in the shoes of the customer and conducts the bill payment transaction directly with the biller. The methods and systems in accordance with some embodiments of the present invention may be beneficial and advantageous to the customer because the bill payment system may conduct numerous transactions with a plurality of billers. For example, the personal identifying information may be saved by the processor. Numerous biller account information with a plurality of billers may be saved by the processor. Accordingly, future bill payment transactions to a plurality of billers may be conducted by a single transaction between the customer and the processor. Additionally, because the processor works directly with the biller, payments to customer accounts may post quicker than they would if traditional payment techniques were followed (e.g., sending a check or utilizing a billing aggregator).

Figure 2:
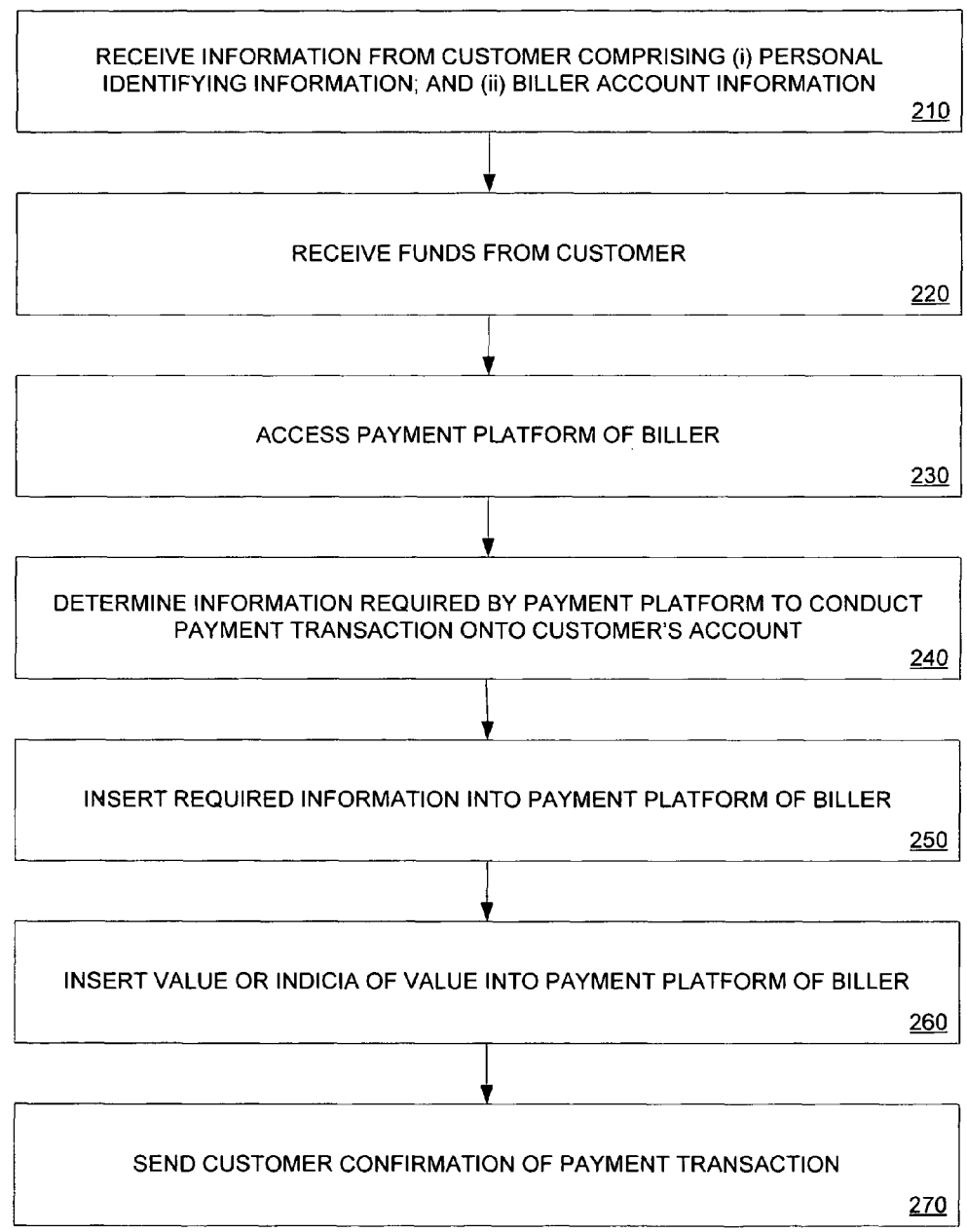
FIG. 2 illustrates a method of facilitating the payment of customer bills utilizing the payment platform of the biller, in accordance with some embodiments of the present invention.

FIG. 2 illustrates a method 20 of facilitating the payment of customer bills utilizing the payment platform of the biller, in accordance with some embodiments of the present invention. The method depicted in FIG. 2 divides the registration component of the method (the provision of information from the customer to the processor) from the payment component of the method (the provision of value from the customer to the processor in order to pay bills).

At S210, the processor may receive from the customer (i) personal identifying information; and (ii) biller account information. As noted above, this information may be received from the customer in any manner and via any channel.

At S220, the processor may receive funds from the customer. This step S220 may comprise the receipt of actual funds, or the receipt of account information in which actual funds or value may be found. Note that a significant period of time may elapse between S210 and S220, and that the channels of communication between the customer and the processor need not be the same in S210 and S220.

At S230, the processor may access the payment platform of the biller. In accordance with some embodiments of the present invention, the payment platform may be an Internet web-site through which a customer may make payments into his or her account with the biller.

At S240, the processor may determine information required by the biller to make a payment into the customer account. This information may be determined and collected in any manner of ways. In accordance with some embodiments of the present invention, this information may be collected through the use of a web-scraping, web-harvesting, or web data extraction program or module. Web scraping, web harvesting, or web data extraction is the process of automatically collecting and extracting information from a particular web site, generally using computer software. Usually, such software programs simulate human exploration of a website. A web scraping module generally collects unstructured web content and converts it into structured data that can be stored and analyzed. In accordance with some embodiments of the present invention, this information may be collected via an application programming interface (API) directly with the payment platform of the biller.

At S250, the processor may provide the required information to the payment platform of the biller. In some embodiments, this may comprise inserting the appropriate information into requested fields on a web-page (such as inserting the customer's name into the field "NAME," or customer's account number into the field "ACCOUNT NUMBER.") In some embodiments, the payment platform may initially require a plurality of information, but for future transactions may only require a log-in and password from the customer. In such circumstances, either the processor establishes the log-in and password, or the processor receives a pre-existing log-in and password from the customer in S210. In some embodiments, the information required by the payment processor may be arranged in a requested manner and transmitted directly to the payment platform, for example via an API.

At S260 the processor may provide value or an indicia of value to the payment platform. For example, if the customer has provided the processor with bank account information, the processor may facilitate a transfer from the customer's bank account to the payment platform. If the customer has provided value to the processor in a format that is not accepted by the payment platform—for example, in the form of a closed-loop gift card—the processor may exchange this received value for value that the payment platform accepts. For example, in some embodiments the processor may receive value in a one format, but may provide payment to the payment platform in the form of a generated open-loop virtual prepaid debit card number. As a non-limiting example, a customer may provide payment to the processor via Wal-Mart gift card; the processor may then create a virtual prepaid Visa debit card, fund the virtual prepaid Visa debit card with the exact amount of the payment to the biller, and provide the biller with the virtual prepaid Visa debit card account number.

As a side note, the generation and provision of open-loop virtual prepaid debit card numbers may have additional or incidental advantages. For example, in the case of a Visa branded stored value card, when such stored value card is redeemed the party that issued the stored value card may be entitled to an interchange fee. An interchange fee is a fee that the recipient's bank (or acquiring bank) pays the issuing bank when the recipient accepts payments using card networks such as Visa and MasterCard. Often, the issuing bank deducts the interchange fee from the amount it pays the acquiring bank. The interchange fee can vary, but is often around 1.5%-2.0% of the transaction value. Because the processor is the issuing bank, the cost of the transaction is reduced by the amount of the interchange fee. This interchange fee may be used as payment to the processor for conducting the payment transaction, or may be leveraged to increase relationships with various billers by reducing the interchange fee or providing off-setting payments.

At S270 the processor may send confirmation of payment to the customer. This confirmation may be in via any communication channel, and may be—though not necessarily—be in the same format as payment instructions were received from the customer. In some embodiments in accordance with the present invention, the confirmation may be send via SMS, MMS, electronic-mail, application notification, messaging on a social networking page, telephone call, page, fax, or any other communication.

Figure 3:
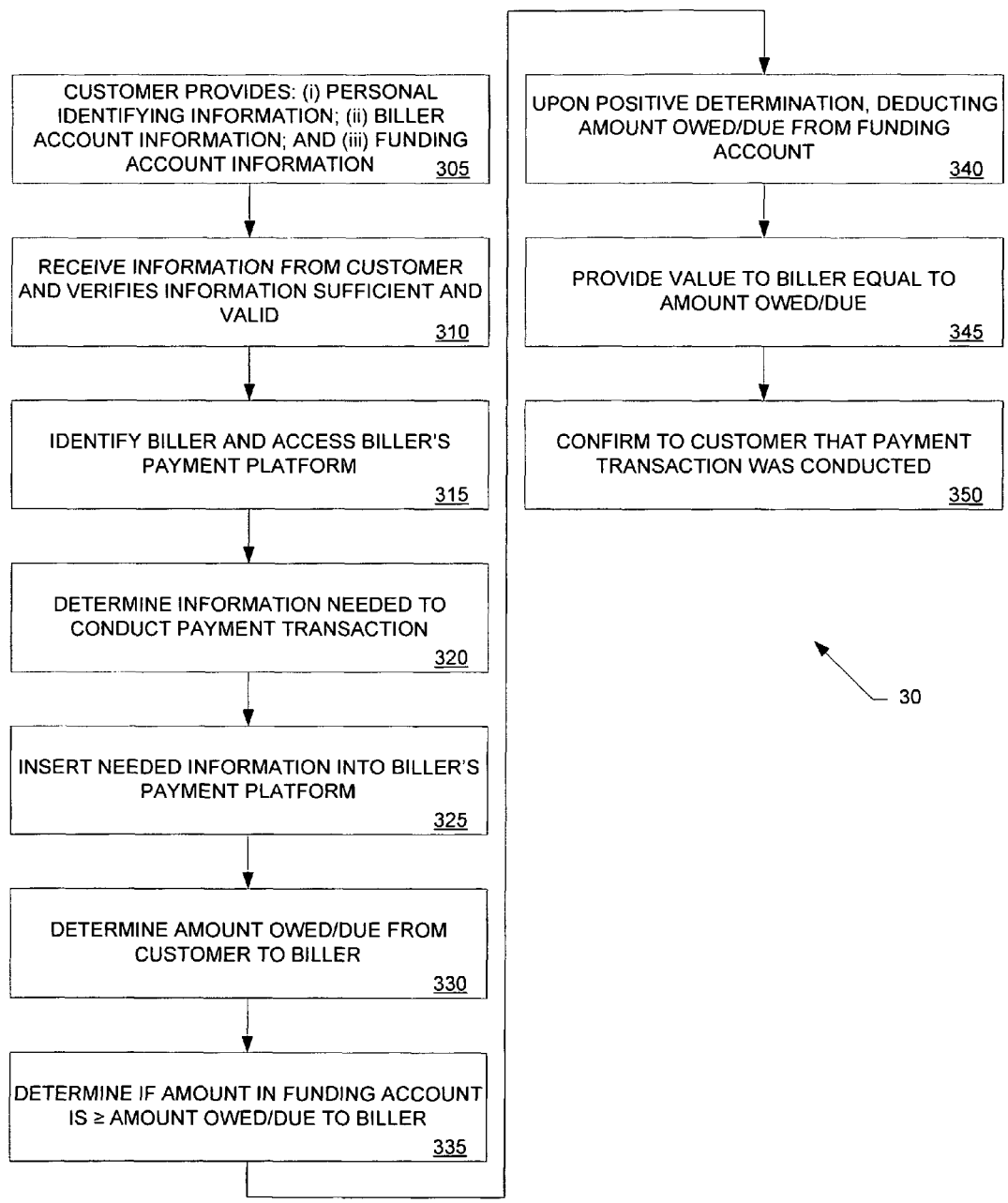
FIG. 3 illustrates a method of facilitating the payment of customer bills utilizing the payment platform of the biller, in accordance with some embodiments of the present invention.

In accordance with FIG. 3, a method 30 of facilitating the payment of customer bills utilizing the payment platform of the biller, in accordance with some embodiments of the present invention will now be discussed. At S305 a customer may provide information to the processor, such as (i) personal identifying information; (ii) biller account information; and (iii) funding account information.

At S310, the processor may receive the information from the customer sent in S305, and may verify that the information is valid and the funding account is properly funded (i.e., has value associated therewith).

At S315, the processor may identify the biller based on the information received from the customer, and may access the biller's payment platform (e.g., the biller's web-site that allows payments to be received and applied to customer accounts).

At S320 the processor may determine the information needed to provide payment to the biller, for example through the use of a web scraping, web harvesting, or web data extraction program.

At S325, the processor may provide the appropriate information to the payment platform in the appropriate format. For example, the processor may fill in a web-based form with blank fields, or may assemble a transmission based upon a known API of the payment platform.

At S330, the processor may determine an amount due from the customer to the biller. This determination may be based upon information received from the payment platform, such as via a communication or through the amount due being posted on a web-page and the processor again utilizing the services of a web scraping, web harvesting, or web data extraction program.

At S335, the processor may determine if the amount of funding provided by the customer (or associated with an account identified by the customer) is greater than or equal to the amount due to the biller. Upon a determination that the amount of funding is insufficient, the transaction may terminate or the processor may inform the customer of the deficiency and request either additional funding sources or a reduction in the amount of payment to make to the biller.

Upon a determination that the amount of funding is sufficient, the processor may deduct the amount due to the biller (or any other amount indicated by the customer) from the funding account, as well as any applicable fees, charges, or taxes. At S345 the processor may provide payment to the payment platform of the biller. At S350 the processor may confirm to the customer that a payment was made, and may inform the customer of the final amount of the payment.

Figure 4:
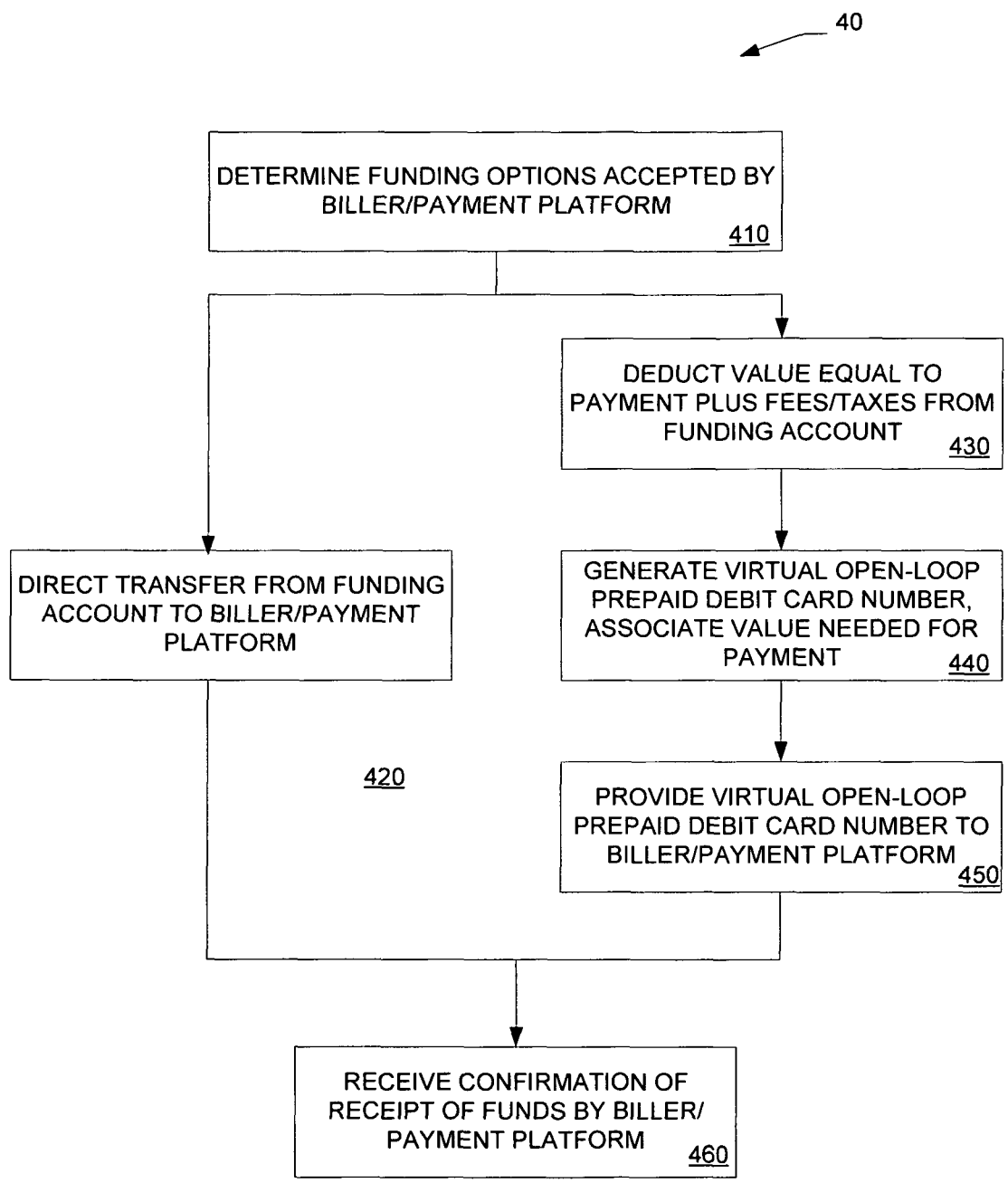
FIG. 4 depicts a process of determining funding options accepted by a biller, as a part of a method of facilitating the payment of customer bills utilizing the payment platform of the biller, in accordance with some embodiments of the present invention.

The form of value provided by the processor to the payment platform at S345 may not be the same form of value received from the customer at S305. With reference to FIG. 4, a process of determining funding options accepted by a biller 40, as a part of a method of facilitating the payment of customer bills utilizing the payment platform of the biller, in accordance with some embodiments of the present invention will now be discussed.

At S410 the processor may determine the types of funding options accepted by the biller and/or the biller's payment platform. For example, some billers may accept direct account transfers, while other billers may only accept payment in the format of Visa or MasterCard. Some billers may accept some forms of closed-loop stored value (for example, payment of a Best Buy line of credit may be made with a Best Buy closed-loop gift card), while other billers may not accept any closed-loop stored value.

At S420, if permitted the processor may facilitate a direct value transfer from an account of the customer (e.g., a financial account such as a checking account) to the payment platform.

If the payment platform does not accept direct transfer of value—or does not accept value in the format provided by the customer, the processor may need to exchange the submitted value. At S430 the processor may deduct the appropriate amount of value from the customer's identified funding source. This amount may include the amount of payment plus any applicable fees or taxes.

Applicable fees or taxes may be based on several factors. There may be originating or set-up fees; there may be service fees associated with each account, each biller, and/or each payment transaction. There may be fees that are applicable when a value exchange is required. Applicable taxes may be based on a plurality of factors, including but not limited to the location associated with the customer account; the location of the origin of the payment request (e.g., an originating computer location (determined by the ISP), an originating point-of-sale device or location, a location of the switch a telephone initiated payment transaction was received at, etc.) the location of the processor; and the location of the provider.

At S440 the processor may generate a virtual open-loop prepaid stored value card or debit card, such as a Visa-branded prepaid debit card. The processor may fund the virtual open-loop prepaid stored value card or debit card with the exact amount of the payment transaction.

At S450 the processor may provide the account number (e.g., virtual card number) of the virtual open-loop prepaid stored value card or debit card to the payment platform. At S460, the processor may receive confirmation of the receipt of funds by the payment platform.

Figure 5:
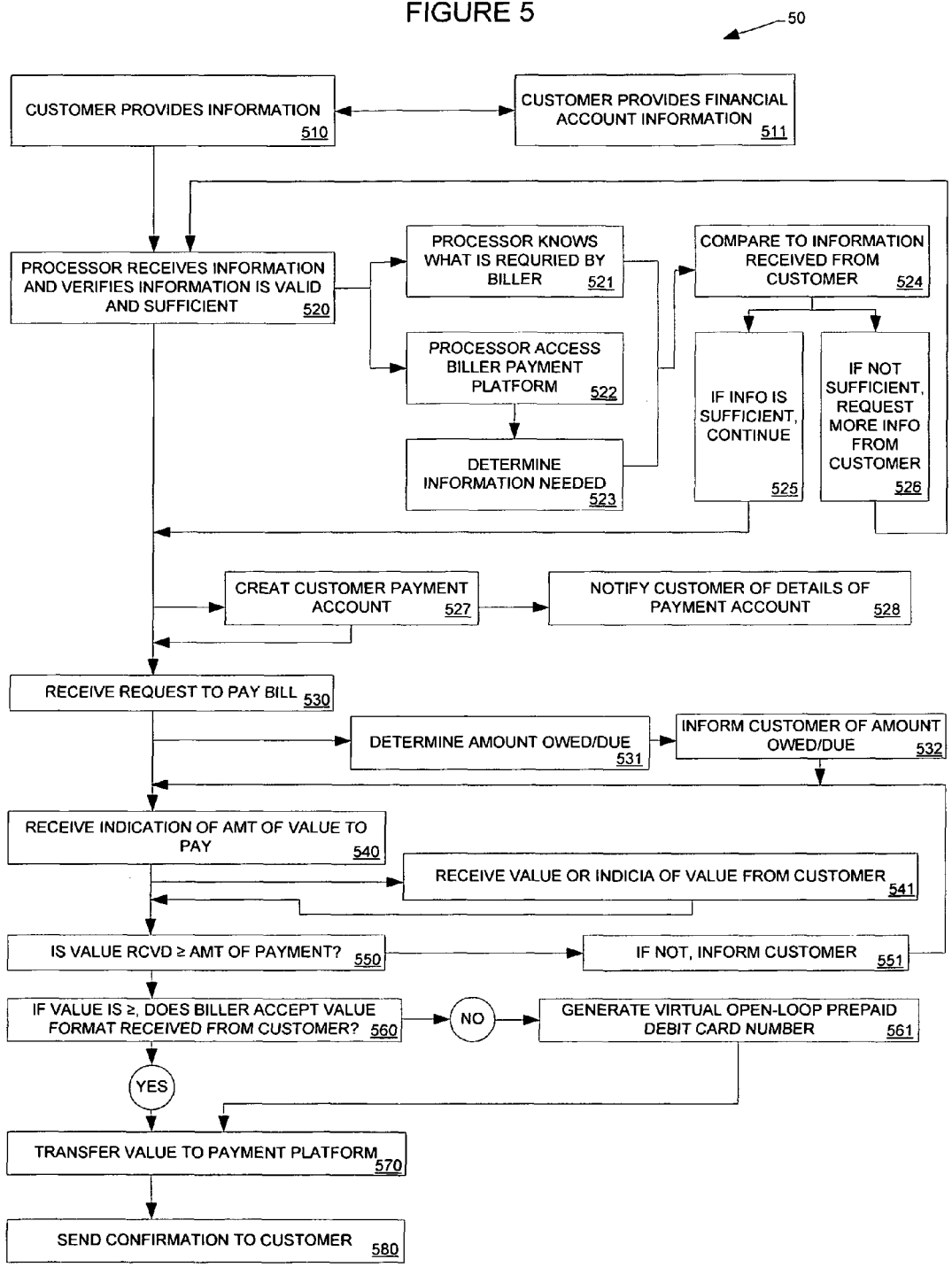
FIG. 5 depicts a method of facilitating the payment of customer bills utilizing the payment platform of the biller, in accordance with some embodiments of the present invention.

With reference to FIG. 5, a method 50 of facilitating the payment of customer bills utilizing the payment platform of the biller, in accordance with some embodiments of the present invention will now be discussed. At S510, a customer may provide information to a processor. Such information may comprise personal identifying information (e.g., name, address, etc.), biller account information (e.g., the name of the biller, the customer's account number). Optionally, at S511 the customer may provide to the processor financial account information to be used for future payments. For example, a customer may provide information sufficient to identify and access a checking account of the customer at S511.

At S520, the processor may receive the information and verify that the information is valid and sufficient to access payment platforms of the identified biller(s) and conduct payment transactions. For example, as S521, based upon the identification of the biller the processor may consult a database or other records to determine what information is required by the biller. Alternatively, at S522 the processor may access the payment platform of the biller and determine, at S523, the information needed by the biller to conduct a payment transaction. This determination may be conducted via a web scraping, web harvesting, or web data extraction program or module.

At S524 the processor may compare the information received from the customer with the information required to conduct payment transactions with the payment platform. If at S525 the information received is sufficient, the process may continue. If the information received is deficient, then at S526 more information may be requested from the customer and the process may return to S520.

Additional optional steps may be included in the process. For example, at S527 the processor may create a customer payment account at the payment platform. S527 may comprise the creation (or assignment) of a log-in and/or password. A customer payment account may prevent the need to continually re-enter various information for future transactions. At S528 the processor may inform the customer of the customer payment account, and may provide the customer with the log-in and/or password needed for access.

At S530, the processor may receive a request from a customer to pay a bill. The request may comprise an identification of the particular biller that the customer wishes to pay. At optional step S531, the processor may access the payment platform of the biller and determine the amount owed and/or due to the biller from the customer. At optional step S532, the processor may inform the customer of this amount.

At S540, the processor may receive from the customer an indication of the amount of value to pay the biller. If the customer did not provide information regarding a financial account in S511—or if the customer chooses not to use such financial account as a funding source, at S541 the processor may receive value or an indicia of value from the customer.

At S550 the processor may determine if the value received from the customer or the funding source or financial account identified by the customer has value greater than or equal to the indicated amount of payment received from the customer in S540. If the value received is not sufficient, or the funding source or financial account is not funded with a sufficient amount of value, at S551 the customer may be informed of the deficiency, and the process may return to S540, where the customer provides a new indication of the amount of value to pay the biller.

At S560, if the amount value received is sufficient, or the funding source or financial account is funded with a sufficient amount of value, the processor may determine if the payment platform accepts value in the format provided by the customer to the processor. If the payment platform does not accept value in the format provided by the customer to the processor, then the processor may generate a virtual open-loop prepaid stored value or debit card number, funded with (or associated with) the amount of payment to be made to the biller.

At S570, value is transferred from the processor to the payment platform of the biller. This value may be in the format provided by the customer to the provider, or may be in the format of a virtual open-loop prepaid stored value or debit card number.

At S580 the processor may provide to the customer a confirmation that a payment transaction was conducted. This confirmation may be send via any communication channel and may be in any format.

Figure 6:
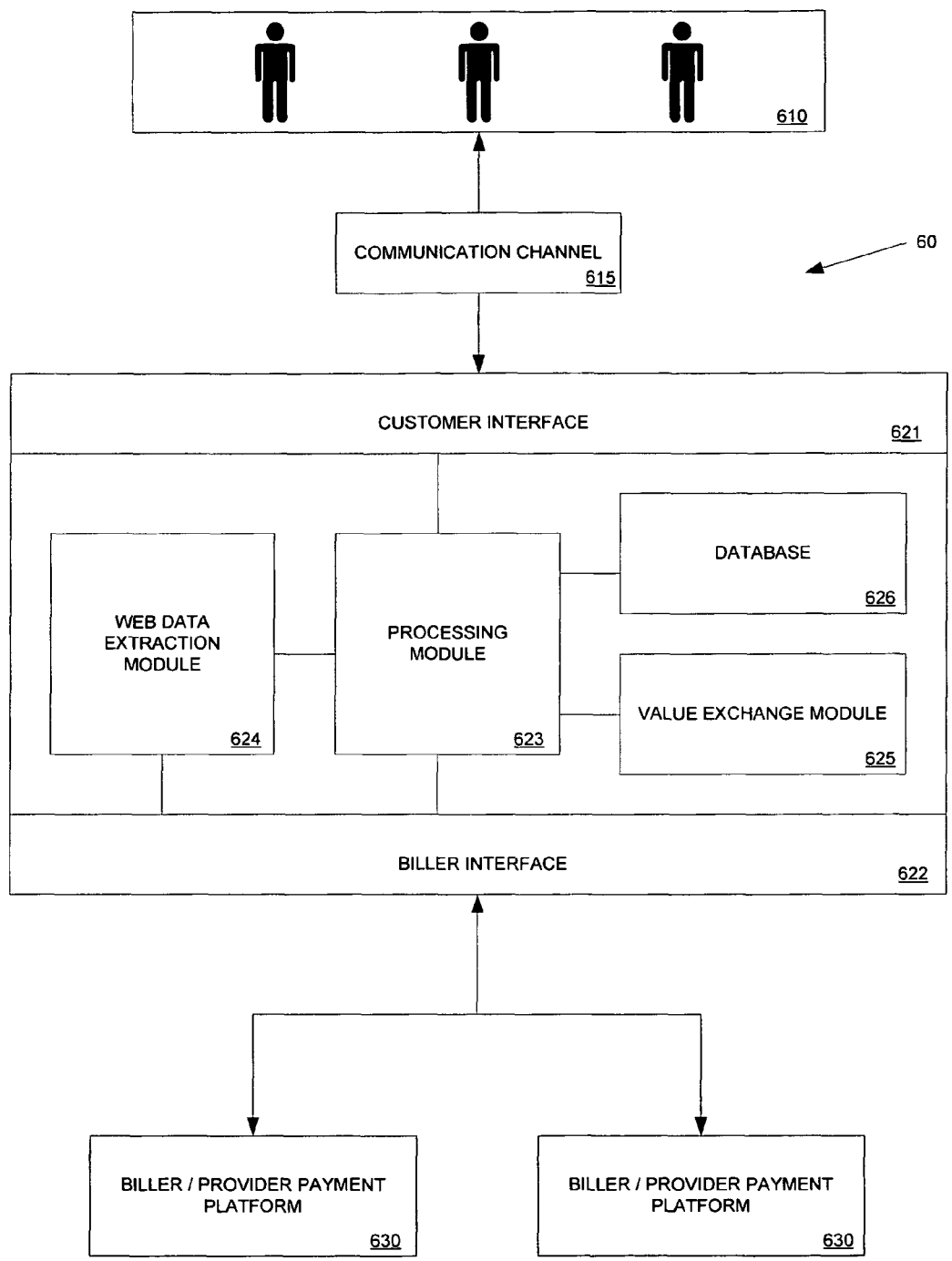
FIG. 6 depicts a system for a facilitating the payment of customer bills utilizing the payment platform of the biller, in accordance with some embodiments of the present invention.

With reference to FIG. 6, a system 60 for a facilitating the payment of customer bills utilizing the payment platform of the biller, in accordance with some embodiments of the present invention will now be discussed. In general, the system 60 comprises one or more customers 610, a processor 620, and one or more payment platforms of billers 630. The one or more customers 610 may communicate with the processor 620 through any variety of communication channels 615, such as (but not limited to) the Internet, interactive voice recognition (IVR) systems, messaging (e.g. SMS or MMS), applications or applets running on electronic devices, communications from a kiosk, point-of-sale device, terminal, or location, etc.

The processor 620 may comprise a customer interface 621, a biller interface 622, a processing module 623, a web data extraction module 624, a value exchange module 625, and a database 626. The customer interface may handle all incoming and outbound communications with the one or more customers 610. Because each customer 610 may utilize a different communication channel 615, the customer communication interface 621 may collectively identify a plurality of interfaces with different communication channels of different customers.

The customer interface 621 may provide selectable communication between the processor and the customer, and may be configured to receive from the customer value, identifying information of the customer, information sufficient to identify the provider and pre-existing account of the customer, and identification of an amount of payment to make to the pre-existing customer account with the provider.

The biller interface 622 may handle all incoming and outbound communications with the one or more billers and payment platforms 630. Because each biller 630 may require different communication attributes (e.g. some billers may accept communications and payment transactions via an API; others may require communications and payment transactions via a particular web-site or web-based payment form), the biller interface 622 may collectively identify a plurality of interfaces with a plurality of billers.

The biller interface may provide selectable communication between the processor and the provider, configured to access a payment platform or website of the provider; and provide information into the payment platform or website of the provider.

The processing module 623 may be communication with each component of the processor 620, including the customer interface 621, the biller interface 622, the web data extraction module 624, the value exchange module 625, and the database 626. The processing module may be configured to perform all required determinations and calculations. For example, the processing module 624 may be configured to at least enter identifying information received from the customer into the payment platform or website and provide value to the payment platform or website.

The web data extraction module 624 may be configured to determine the information required by the biller to make a payment. This may be performed by scraping a web page of the payment platform and determining what information is required, and where to appropriately insert such information.

The value exchange module 625 may provide a means for accepting value in a first format as provided by the customer, and exchanging it for value of a second format (minus any applicable fees or taxes) that is accepted by the biller or payment platform. For example, the value exchange module 625 may accept closed-loop stored value and exchange it for a virtual open-loop stored value or debit card.

The database 626 may be coupled to the processing module 623, and may store the information received from the customer, and may also store information pertaining to the pre-existing customer account with the biller. For example, if a customer payment account with specific log-in and password information is established or utilized, the database may store the required log-in and password information in a record associated with the specific biller and the specific customer. The database may also store past transaction information which may be utilized for record keeping purposes or for recurring or periodic payments.

Figure 7:
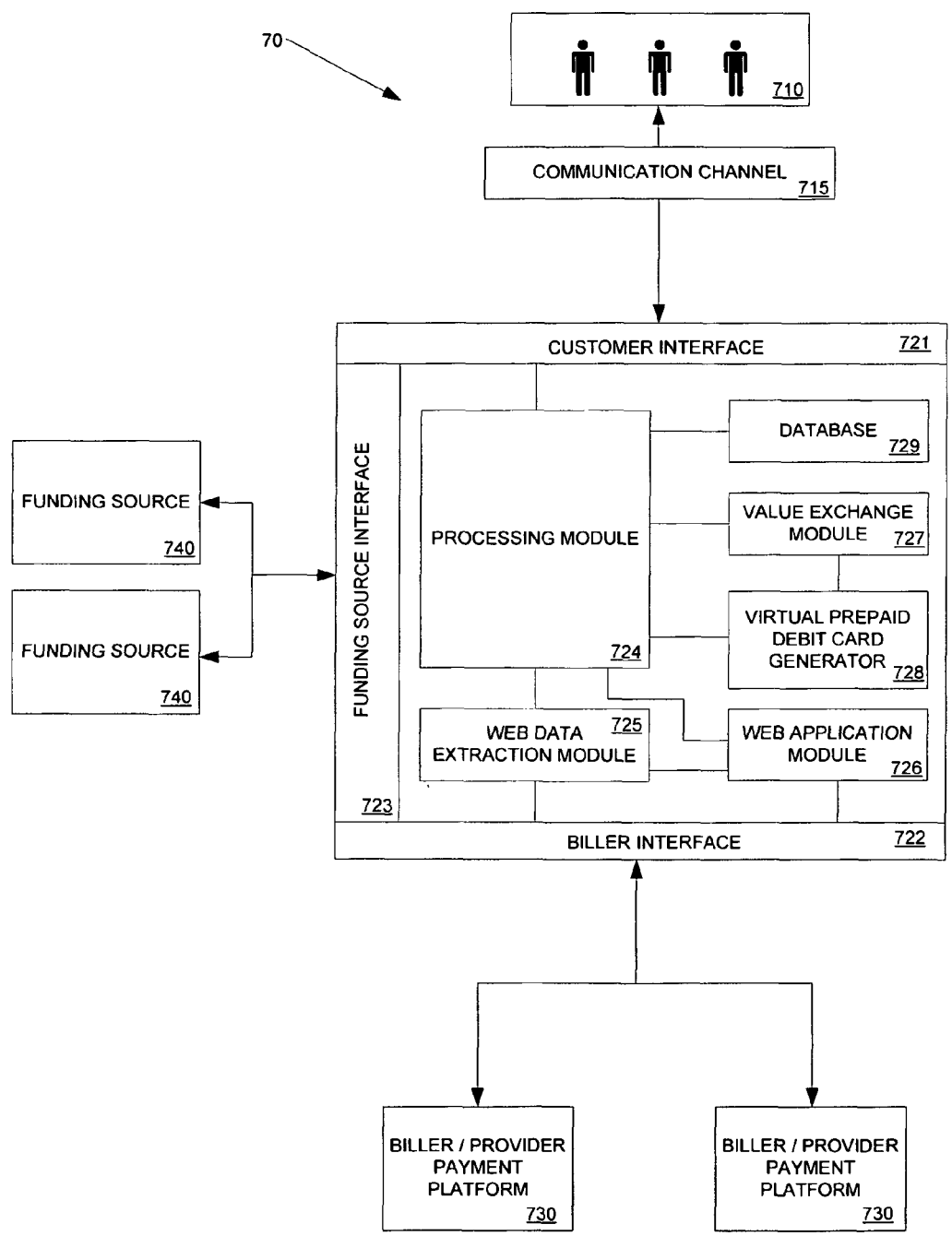
FIG. 7 depicts a system for a facilitating the payment of customer bills utilizing the payment platform of the biller, in accordance with some embodiments of the present invention.

With reference to FIG. 7, a system 70 for a facilitating the payment of customer bills utilizing the payment platform of the biller, in accordance with some embodiments of the present invention will now be discussed. In general, system 70 comprises one or more customer 710, a processor 720, one or more billers 730, and one or more financial institutions 740. The one or more customers 710 may communicate with the processor 720 through any variety of communication channels 715, such as (but not limited to) the Internet, interactive voice recognition (IVR) systems, messaging (e.g. SMS or MMS), applications or applets running on electronic devices, communications from a kiosk, point-of-sale device, terminal, or location, etc.

The one or more billers 730 may comprise providers that sell goods or services to the one or more customers 710, or may comprise entities separate from the providers of goods or services that perform billing functions for or on behalf of the providers. The one or more financial institutions 740 may comprise financial institutions where one or more of the customers 710 have financial accounts that may be used to make payments to the one or more billers 730.

The processor 720 comprises a customer interface 721, a biller interface 722, a funding source interface 723, a processing module 724, a web data extraction module 725, a web application module 726, a value exchange module 727, a virtual prepaid debit card generator 728, and a database 729.

The customer interface 721 may handle all incoming and outbound communications with the one or more customers 710. Because each customer 710 may utilize a different communication channel 715, the customer communication interface 721 may collectively identify a plurality of interfaces with different communication channels of different customers.

The customer interface 721 may provide selectable communication between the processor and the customer, and may be configured to receive from the customer value, identifying information of the customer, information sufficient to identify the provider and pre-existing account of the customer, and identification of an amount of payment to make to the pre-existing customer account with the provider.

The biller interface 722 may handle all incoming and outbound communications with the one or more billers and payment platforms 730. Because each biller 730 may require different communication attributes (e.g. some billers may accept communications and payment transactions via an API; others may require communications and payment transactions via a particular web-site or web-based payment form), the biller interface 722 may collectively identify a plurality of interfaces with a plurality of billers.

The biller interface 722 may provide selectable communication between the processor 720 and the provider or biller 730, configured to access a payment platform or website of the biller or provider; and provide information into the payment platform or website of the biller or provider.

The funding source interface 723 may handle all incoming and outbound communications with the one or more funding sources. Because each funding source 740 may require different communication attributes (e.g. some funding sources, such as financial institutions may require increased security or authorization), the funding source interface 723 may collectively identify a plurality of interfaces with a plurality of funding sources.

The processing module 724 may be in communication with all other components of the processor 720. The processing module 724 may perform all determinations necessary to conduct payment transactions, as set forth in FIGS. 1-5 and their accompanying discussion.

The web data extraction module 725 may be configured to determine the information required by the biller to make a payment. This may be performed by scraping a web page of the payment platform and determining what information is required, and where to appropriately insert such information.

The web application module 726 may interact with payment platform web-sites of billers, and may be utilized to insert the proper information into the appropriate field, box, or entry area in or on various billers payment platform systems. In other words, the web application module 726 may identify each piece of information requested by the provider payment platform, determine the appropriate information from the identifying information received from the customer, and provide, in response to each piece of information requested by the provider payment platform, the appropriate information. This may comprise automatically filling in an online form.

The value exchange module 727 may provide a means for accepting value in a first format as provided by the customer, and exchanging it for value of a second format (minus any applicable fees or taxes) that is accepted by the biller or payment platform. When the value received from the customer is to be exchanged for a virtual open-loop stored value or debit card, the value exchange module 727 may interact with the virtual prepaid debit card generator 728. The virtual prepaid debit card generator 728 may generate virtual debit cards that may be accepted by the billers (e.g., Visa or MasterCard branded prepaid debit cards) funded in an amount equal to the payment to be made to the biller.

The database 729 may be coupled to the processing module 724, and may store the information received from the customer, and may also store information pertaining to the pre-existing customer account with the biller. For example, if a customer payment account with specific log-in and password information is established or utilized, the database may store the required log-in and password information in a record associated with the specific biller and the specific customer. The database may also store past transaction information which may be utilized for record keeping purposes or for recurring or periodic payments.

It will be understood that the specific embodiments of the present invention shown and described herein are exemplary only. Numerous variations, changes, substitutions and equivalents will now occur to those skilled in the art without departing from the spirit and scope of the invention. For instance, processor may be maintained or managed by a financial institution, funding source, merchant, or biller. Accordingly, it is intended that all subject matter described herein and shown in the accompanying drawings be regarded as illustrative only, and not in a limiting sense, and that the scope of the invention will be solely determined by the appended claims.

What is claimed is:

1. A computerized method of providing payment into a pre-existing customer account with a provider of goods or services, the method facilitated between a customer, a provider of goods or services, and a central processor, the method comprising:
   receiving at the central processor from the customer:
      value;
      identifying information of the customer; and
      information sufficient to identify the provider and the pre-existing customer account;
   accessing by the central processor a payment platform of the provider;
   determining by the central processor information required by the payment platform of the provider in order to provide payment into the pre-existing customer account utilizing the payment platform of the provider;
   communicating from the central processor to the payment platform of the provider information required by the payment platform of provider in order to provide payment into the pre-existing customer account;
   determining by the central processor if the provider accepts payment via the payment website in the form of value received from the customer;
   upon a determination that the provider does not accept payment via the payment website in the form of value received from the customer, creating, by the central processor, a virtual prepaid debit card number funded with an amount equal to the value to be provided to the payment platform of the provider;
   providing the virtual prepaid debit card number by the central processor to the payment platform of the provider for conveyance of the associated value into the pre-existing customer account.

2. The method of claim 1, wherein the value, identifying information of the customer, and information sufficient to identify the provider and the pre-existing customer account of the customer are received via a manner selected from the group consisting of: the Internet, an automated voice recognition (IVR) system, a message sent via short message service (SMS), a message sent via media message service (MMS), an application running on a mobile device, a kiosk, a point-of-sale device, and a merchant location.

3. The method of claim 1, wherein the value received from the customer comprises access to a stored value account.

4. The method of claim 3, wherein the stored value account is a closed-loop stored value account.

5. The method of claim 1, wherein the value received from the customer comprises payment made by the customer to a point-of-sale device, and wherein the central processor settles with the point-of-sale device at a later time.

6. The method of claim 1, wherein the identifying information of the customer comprises information required by the payment platform of the provider to make a payment into the pre-existing customer account.

7. The method of claim 6, wherein the identifying information includes log-in information and a password.

8. The method of claim 1, wherein the information sufficient to identify the provider and pre-existing customer account-comprises an account number.

9. The method of claim 1, wherein the information sufficient to identify the provider and pre-existing customer account comprises an indicia associated with the customer's account with the provider.

10. The method of claim 9, wherein the indicia comprises a telephone number.

11. The method of claim 1, wherein the step of accessing a payment platform of the provider is accomplished by the central processor via the Internet.

12. The method of claim 1, wherein the step of accessing a payment platform of the provider comprises accessing by the central processor a payment web-page maintained by or associated with the provider.

13. The method of claim 1, wherein the step of determining information required by the payment processor of the provider is accomplished by the central processor via a web-scraping or web data extraction program performed by the processor.

14. The method of claim 1, wherein the step of communicating by the central processor information required by the payment processor of the provider in order to provide payment into the pre-existing customer account comprises inserting identifying information received from the customer into appropriate fields in the payment platform of the provider.

15. The method of claim 1, wherein the step of communicating by the central processor information required by the payment platform of the provider comprises:
   identifying each piece of information requested by the payment platform of the provider;
   determining the appropriate information from the identifying information received from the customer;
   providing, in response to each piece of information requested by the payment platform of the provider, the appropriate information.

16. The method of claim 15, wherein the step of communicating information required by the payment platform of the provider comprises automatically filling in an online form.

17. The method of claim 1, wherein the step of providing a value into the pre-existing customer account comprises transmitting the value received from the customer to the pre-existing customer account with the provider.

18. The method of claim 17, wherein the value provided into the pre-existing customer account is the remainder of the value received from the customer once applicable fees and taxes have been deducted.

19. The method of claim 18, wherein value is received from the customer at a point-of-sale device and wherein applicable fees and taxes are calculated based upon one or more factors selected from the group consisting of: the location associated with the pre-existing customer account; the location of the point-of-sale device; the location of the processor; and the location of the provider.

20. A computerized method of providing payment into a pre-existing customer account with a provider of goods or services, the method facilitated between a customer, a provider of goods or services, and a central processor, the method comprising:
   receiving by the central processor from the customer:
      value;
      identifying information of the customer, comprising the customer's name and address; and
         information sufficient to identify the provider and the pre-existing customer account, comprising the account number of the pre-existing customer account;
         identification of an amount of payment to make to the pre-existing customer account;
   accessing, by the central processor via the internet, a payment website of the provider;
   scraping the payment website by the central processor in order to determine the information required by the provider to make a payment;
   the central processor acting in lieu of the customer and entering identifying information received from the customer into the payment website;
   determining by the central processor if the provider accepts payment via the payment website in the form of value received from the customer;
   upon a determination that the provider accepts payment via the payment website in the form of value received from the customer, conveying value received from the customer to the provider via the payment website;
   upon a determination that the provider does not accept payment via the payment website in the form of value received from the customer, creating a virtual prepaid debit card number funded with an amount equal to the payment to be made to the provider, and conveying the virtual prepaid debit card number to the provider via the payment website;
   providing a confirmation of payment to the customer.

21. The method of claim 20, wherein the value, identifying information of the customer, and information sufficient to identify the provider and the pre-existing customer account are received via a manner selected from the group consisting of: the Internet, an automated voice recognition (IVR) system, a message sent via short message service (SMS), a message sent via media message service (MMS), an application running on a mobile device, a kiosk, a point-of-sale device, and a merchant location.

22. The method of claim 20, wherein the value received from the customer comprises a payment made by the customer to a point-of-sale device, and wherein the central processor settles with the point-of-sale device at a later time.

23. The method of claim 20, wherein the value received from the customer comprises access to a stored value account.

24. The method of claim 23, wherein the stored value account is a closed-loop stored value account.

25. The method of claim 24, wherein the value received from the customer comprises a payment made by the customer at a merchant using a closed-loop stored value card that is only redeemable with the merchant.

* * * * *

UNITED STATES PATENT AND TRADEMARK OFFICE
CERTIFICATE OF CORRECTION

| | | |
|---|---|---|
| PATENT NO. | : 8,566,240 B2 | Page 1 of 1 |
| APPLICATION NO. | : 12/807046 | |
| DATED | : October 22, 2013 | |
| INVENTOR(S) | : Merrill Brooks Smith et al. | |

It is certified that error appears in the above-identified patent and that said Letters Patent is hereby corrected as shown below:

In the Specification

Column 1, Line 58:   The word "interne" should be changed to --internet--.

Column 2, Line 35:   The word "interne" should be changed to --internet--.

Column 8, Line 4:    The word "send" should be --sent--.

Column 10, Line 53:  The word "send" should be --sent--.

Column 11, Line 65:  The word "a" should be deleted.

In the Claims

Column 14, Line 6:   The word "website" should be changed to --platform--.

Column 14, Line 9:   The word "website" should be changed to --platform--.

Signed and Sealed this
Third Day of December, 2013

Margaret A. Focarino
*Commissioner for Patents of the United States Patent and Trademark Office*